June 4, 1935.  W. O. AMSLER  2,003,525
APPARATUS FOR DRAWING GLASS
Filed Nov. 1, 1933   2 Sheets-Sheet 1
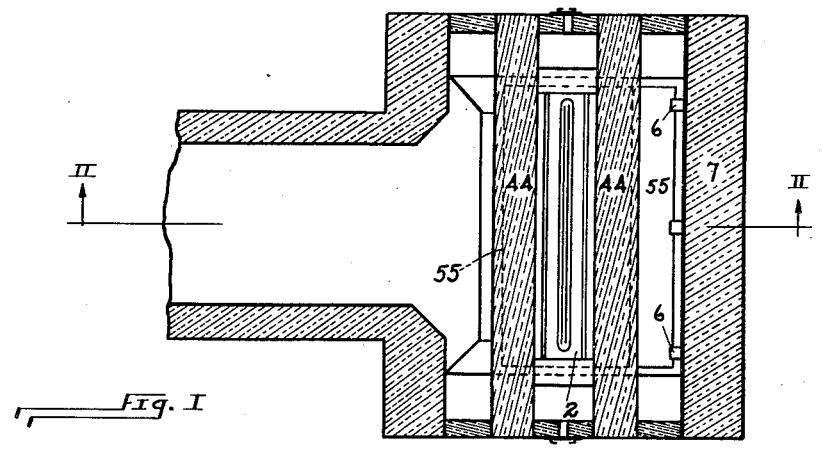
Fig. I
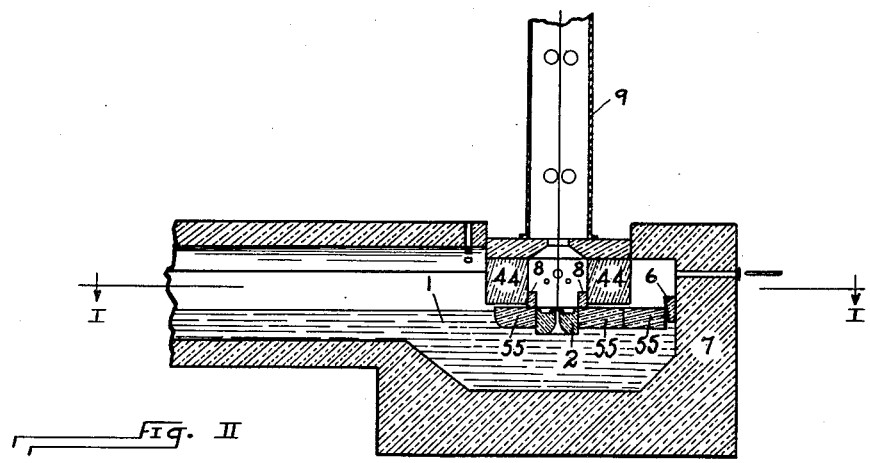
Fig. II
INVENTOR
Walter O. Amsler
by Christy Christy and Wharton
his attorneys June 4, 1935. W. O. AMSLER 2,003,525
APPARATUS FOR DRAWING GLASS
Filed Nov. 1, 1933 2 Sheets-Sheet 2
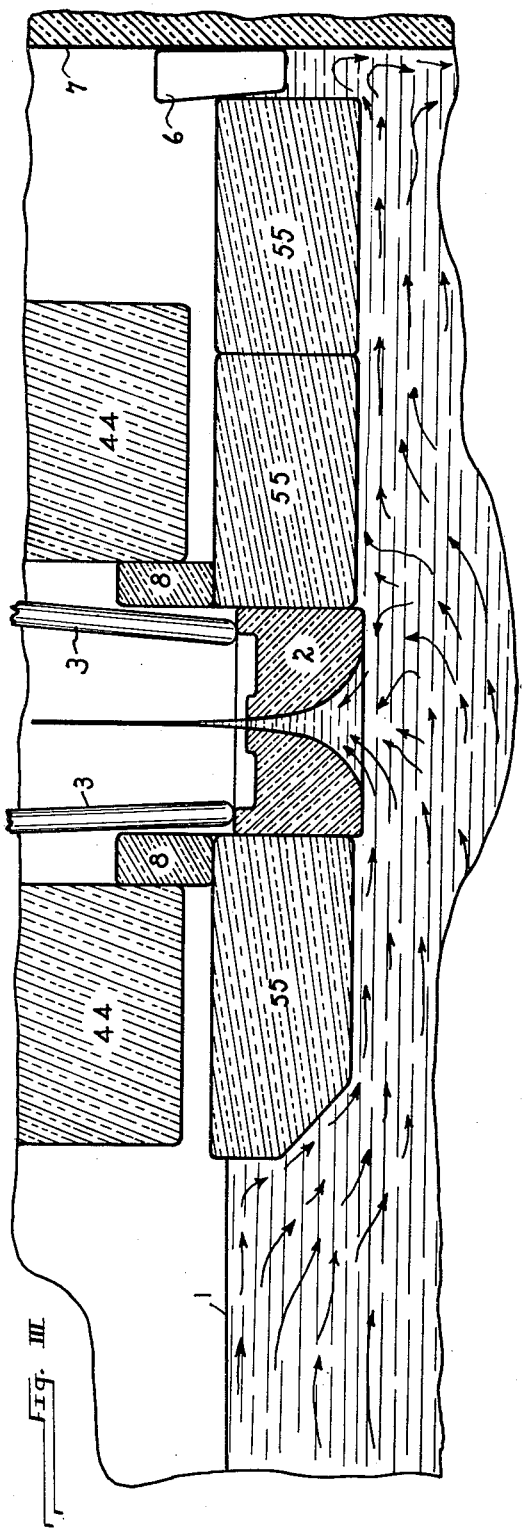

Patented June 4, 1935

2,003,525

UNITED STATES PATENT OFFICE 2,003,525

APPARATUS FOR DRAWING GLASS

Walter O. Amsler, Toledo, Ohio, assignor to Simplex Engineering Company, Washington, Pa., a corporation of Delaware Application November 1, 1933, Serial No. 696,192

2 Claims. (Cl. 49—17)

This invention relates to the drawing of sheet glass and consists in improvement in furnace structure, in consequence of which the quality of the product is improved, and in method as well.

The furnace structure of the present invention is illustrated in the accompanying drawings. Fig. I is a view in horizontal section of that portion of a glass furnace for the drawing of sheet glass in which invention has been made. The plane of section is indicated by the line I—I, Fig. II. Fig. II is a view of the same structure in vertical section, on the plane indicated at II—II, Fig. I. Fig. III is a fragmentary view to larger scale, on the same plane with Fig. II.

In the established system of drawing sheet glass the molten glass is caused to rise through a slot in a refractory floating block by depressing the block until the upper edge of the slot is lower than the level of the glass on either side of the block. The exuding tongue of glass is picked up by a bait and is drawn upward at a speed greater than that of normal flow through the slot. As it rises the sheet is cooled. In consequence, the sheet is attenuated to and solidified at the desired thickness.

Referring to Figs. I and II, the working end of a glass furnace is shown. It will be understood that the body of molten glass 1 within this portion of the furnace has been melted and refined in known manner in a portion of the furnace, not shown, that lies to the left, and that the body 1 within the working end of the chamber is, as operation progresses, being constantly renewed by the flow of molten glass from the refining end of the furnace.

Bridge-walls 44 span transversely the working end of the furnace and serve to partition off the drawing-chamber from the rest of the furnace. These bridge walls are heavy flat arches, and they are designed to keep the drawing chamber (which they define) relatively cool during the drawing operation. The apparatus for cooling the sheet progressively as it is formed (not shown) is arranged between these bridge walls, and this apparatus has effect in cooling the chamber itself, as well as the drawn sheet of glass. In furnaces heretofore known the bridge walls are so formed that in normal operation the bath of molten glass within the furnace rises to a higher level than their lower edges. Solid blocks of refractory material, which extend practically the full length of the bridge walls, are submerged in the molten glass immediately beneath the bridges. Buoyance keeps them in place. In point of fact, however, as operation continues, it becomes practically impossible to move these blocks from their positions, for relatively cold glass on the drawing-chamber side cements the joints, where the blocks abut upon the bridges. The blocks 5 become in effect downward extensions of the bridge walls 4.

The glass that is drawn in furnaces such as heretofore known is not optically perfect. It is possessed of a waviness of surface. The optical distortion noticeable in drawn glass that has not, after drawing, been ground and polished is due to such waviness.

I have discovered the cause of this waviness of surface, and my invention consists in such a reconstruction of the furnace itself as to prevent the occurrence of waviness and to afford a sheet that by uniformity in this particular is superior to the product heretofore obtained.

It is requisite that the bridge walls stand apart at a considerable interval, exceeding the width of the slotted draw-block; for, in normal operation, the draw-block wears away and has to be replaced at intervals of from one to three weeks of continuous operation, and space must be provided for tools which, introduced through openings in the furnace walls, grapple the draw-block and lift it out and then introduce another block in place of the one worn out. In consequence, surfaces of molten glass on either side of the draw-block and between the draw-block and the bridge walls lie exposed to the cooling effect of the drawing chamber. The glass at these exposed surfaces becomes relatively viscid, and from these surfaces downward fluidity increases, until at length the fluidity is that elsewhere prevalent in the body of molten glass within the furnace. As the sheet-drawing operation progresses, a film of cooler glass is drawn downward along the outer sides of the draw-block and advances with the hotter glass to and through the slot. Since the distance through which this cooler layer of glass advances to the slot is relatively short, it does not become uniformly heated with the main stream. Viscosity of glass, under such operating conditions as these, varies greatly with slight changes of temperature. The inequality in viscosity described has the effect of producing inequalities in the thickness of the drawn sheet, and waviness of surface, with consequent optical imperfection. Since glass so drawn is largely used for window glass, the defect of optical imperfection is a serious one.

The bridge walls 44 are so proportioned that, when the batch of molten glass is at proper level for operation, the arches of these bridge walls stand clear, at a slight but sufficient interval from the surface of the glass, and blocks 55, freely floating upon the glass beneath the bridge walls, bear immediately upon the draw-block 2 on either side. These blocks, floating on the glass, are freely movable beneath the bridge walls; and, co-acting with the draw-block, they cover the surface in continuity and completely, so that in no part is the surface of the molten body of glass exposed to the cooling effect of the drawing-chamber. This floating structure, then, constitutes a continuous shield beneath the drawing-chamber. The spaces beneath the bridge walls and above the floating screen may be closed by removable blocks 8 of insulating material, resting upon the blocks 55. In consequence of such changes in structure, the glass advancing to and through the slot in the draw-block is superior in uniformity of viscosity; the drawn sheet is improved in uniformity of thickness and in evenness of surface; and the optical quality of the product is superior.

In the hitherto usual assembly, the draw-block 2, when first brought to position, is held in position until at its ends it freezes to the walls, and it continues frozen to place as operation progresses. In the assembly improved in the manner described, and as shown in Fig. III, I do not rely upon freezing to hold the draw-block 2 in place. I assemble the parts in the relative positions shown, and by means of wedge blocks 6, interposed between the terminal block 55 of the line and the furnace wall 7, I bring the draw-block accurately to position beneath the drawing apparatus. When such alignment has been effected, bars 3, such as are commonly in use, are brought to bear upon the draw-block and are then advanced downwardly, to bring the draw-block to proper depressed position. When the block assembly has been adjusted, the closure blocks 8 are applied. The alignment of blocks 55, 2, 55, etc. will automatically maintain itself in block-to-block abutment, and in abutment through wedge blocks 6 upon the end wall of the furnace, because of the constant superficial stream of glass that advances from left to right from the refining end of the glass furnace to the working end.

In order to replace a draw-block, the bars 3 are removed and the blocks 8, and then the drawing-chamber is heated to about 2300–2400° F. (as is the usual practice), the wedge blocks 6 are removed, and the floating blocks 55 moved away to right and left, leaving the draw-block free. It then may be grappled, lifted out, and replaced in usual manner. When replaced, the blocks 55 are floated to abutment upon it; the wedge blocks 6 are applied and by them the position of the draw-block is minutely adjusted again; the blocks 8 are replaced; and again the bars 3 are lowered, depressing the draw-block and initiating the drawing operation.

I claim as my invention:

1. In a furnace for sheet-glass drawing, a drawing-chamber defined by bridge walls and by a floating structure including a draw-block, forming beneath and between the bridge walls a continuous screen on the surface of the body of molten glass within the furnace and responsive to the flow of streams circulating within the body of glass, and means for adjusting minutely the position of the draw-block beneath the drawing-chamber, such means consisting of a wedge-block interposed between the said floating structure and a rigid portion of the furnace structure.

2. In a furnace for sheet-glass drawing, a drawing chamber defined by bridge walls and by a structure including a draw-block, the said structure floating upon the surface of the molten glass within the chamber free of contact with the bridge walls and constituting a continuous screen upon the surface of the glass and between the bridge walls, and means for adjusting such floating structure and the draw-block as part thereof in its position beneath the bridge walls.

WALTER O. AMSLER.